United States Patent [19]

Spooner

[11] 3,993,094

[45] Nov. 23, 1976

[54] REMOVABLE RESERVOIR COVER HAVING INTERNAL PARTS OF RESERVOIR MOUNTED THEREON

[75] Inventor: Ronald E. Spooner, Richton Park, Ill.

[73] Assignee: Allis-Chalmers Corporation, Milwaukee, Wis.

[22] Filed: Apr. 21, 1975

[21] Appl. No.: 570,198

[52] U.S. Cl. .......... 137/588; 137/590; 137/592; 137/574; 137/576; 60/DIG. 10; 220/20; 220/86 R

[51] Int. Cl.$^{2}$ .......... F16K 24/00

[58] Field of Search .......... 137/588, 574, 576, 590, 137/592; 60/477, DIG. 10, 478, 453, 458; 220/86 R, 20

[56] References Cited

UNITED STATES PATENTS

| | | | |
|---|---|---|---|
| 633,066 | 9/1899 | Brewer | 137/592 |
| 1,872,548 | 8/1932 | Zur Löwen | 137/590 |
| 2,018,687 | 10/1935 | Sims | 137/588 |
| 2,438,245 | 3/1948 | Gregg | 137/592 |
| 2,673,571 | 3/1954 | Lerom | 137/590 |
| 2,704,454 | 3/1955 | Martin | 220/86 R |
| 2,828,766 | 4/1958 | Postmus | 137/590 |
| 2,860,809 | 11/1958 | Perry | 137/574 |
| 2,942,581 | 6/1960 | Gaffney | 60/DIG. 10 |
| 3,604,205 | 9/1971 | Geselbracht et al. | 60/477 |
| 3,918,487 | 11/1975 | Smithson | 137/588 |

FOREIGN PATENTS OR APPLICATIONS

| | | | |
|---|---|---|---|
| 76,672 | 2/1917 | Switzerland | 137/574 |

*Primary Examiner*—William R. Cline
*Assistant Examiner*—H. Jay Spiegel
*Attorney, Agent, or Firm*—Robert C. Sullivan

[57] ABSTRACT

A detachable cover member for use with a reservoir for hydraulic fluid such as oil in which the various components associated with the reservoir are rigidly mounted on the cover member and are removed from the reservoir tank when the cover is removed. Thus, the suction conduit and the return conduit extend through and are both rigidly secured, as by welding, to the detachable cover member. The respective suction and return conduits are adapted to extend down into the interior of the reservoir tank when the cover member is secured in overlying relation to the cover-receiving opening of the reservoir. A baffle member is rigidly secured to the normally inner surface of the cover member in a plane substantially perpendicular to the inner surface of the cover to divide the interior of the reservoir into suction and return chambers, the baffle being so constructed as to permit fluid communication between the two chambers. Each of the respective suction and return conduits extends from its respective rigid connection to the cover member through the baffle member, each respective conduit being rigidly connected as by welding to the baffle to provide a reinforced construction for the cover subassembly. A " breather" device is rigidly mounted on the normally outer surface of the cover member and is in gaseous communication with the interior of the upper end of the reservoir to maintain atmospheric pressure above the liquid level in the reservoir tank. A combined fill tube and dip stick holder are also rigidly mounted on the detachable cover member. Thus, when the detachable cover member is removed from the reservoir, all of the aforementioned components are removed along with the cover.

12 Claims, 3 Drawing Figures

REMOVABLE RESERVOIR COVER HAVING INTERNAL PARTS OF RESERVOIR MOUNTED THEREON

BACKGROUND OF THE INVENTION

1. Field of the Invention

This invention relates to reservoirs or tanks for hydraulic fluids such as oil, and more particularly, to a reservoir for hydraulic fluids and to detachable cover member for such reservoir, in which substantially all of the internal parts of the reservoir are mounted on the removable cover of the reservoir.

2. Description of the Prior Art

In hydraulic fluid reservoirs of the prior art of the type with which I am aware, the common practice was to mount various internal components, such as the inlet pipe, suction pipe, baffle, etc., within the interior of the reservoir or tank, in such manner that these elements remain within the interior of the tank when the cover of the tank was removed for servicing or for other reasons. The fact that such components or elements used in connection with the tank or reservoir are mounted within the interior of the reservoir frequently presented problems when the internal components associated with the reservoir were being serviced, or when it was desired to clean the interior of the reservoir, since the various internally mounted components presented obstructions to cleaning of the interior of the reservoir.

STATEMENT OF THE INVENTION

Accordingly, it is an object of the present invention to provide a reservoir or tank for a hydraulic fluid, such as oil, for example, having a removable tank cover, and in which substantially all of the elements or components normally positioned within the interior of the reservoir are mounted on the cover in such a manner to be removable from the interior of the reservoir when the cover is removed from the reservoir.

It is a further object of the invention to provide a reservoir or tank for a hydraulic fluid in which substantially all of the components normally mounted within the reservoir are mounted on and removable with a removable cover member for the reservoir whereby to provide a subassembly comprising the cover member and the components mounted thereon, this subassembly facilitating the manufacture and assembly of the reservoir, as well as facilitating repair and maintenance operations on the reservoir and its components.

It is another object of the invention to provide a subassembly for use with a reservoir for hydraulic fluid such as oil which subassembly comprises a removable cover member for the reservoir tank in which substantially all of the components which normally project into the interior of the reservoir tank are rigidly mounted on and removable with the cover member.

In achievement of these objectives there is provided in accordance with an embodiment of the invention a detachable cover member for use with a reservoir for hydraulic fluid such as oil in which the various components associated with the reservoir are rigidly mounted on the cover member and are removed from the reservoir tank when the cover is removed. Thus, the suction conduit and the return conduit extend through and are both rigidly secured, as by welding, to the detachable cover member. The respective suction and return conduits are adapted to extend down into the interior of the reservoir when the cover member is secured in overlying relation to the cover-receiving opening of the reservoir. A baffle member is rigidly secured to the normally inner surface of the cover member in a plane substantially perpendicular to the inner surface of the cover to divide the interior of the reservoir into suction and return chambers, the baffle being so constructed as to permit fluid communication between the two chambers. Each of the respective suction and return conduits extends from its respective rigid connection to the cover member through the baffle member, each respective conduit being rigidly connected as by welding to the baffle to provide a reinforced construction for the cover subassembly. A "breather" device is rigidly mounted on the normally outer surface of the cover member and is in gaseous communication with the interior of the upper end of the reservoir to maintain atmospheric pressure above the liquid level in the reservoir. A combined fill tube and dip stick holder are also rigidly mounted on the detachable cover member. Thus, when the detachable cover member is removed from the reservoir, all of the aforementioned components are removed along with the cover.

BRIEF DESCRIPTION OF THE DRAWINGS

Further objects and advantages of the invention will become apparent from the following description taken in conjunction with the accompanying drawing in which.

DESCRIPTION OF THE PREFERRED EMBODIMENT

Figure 2:
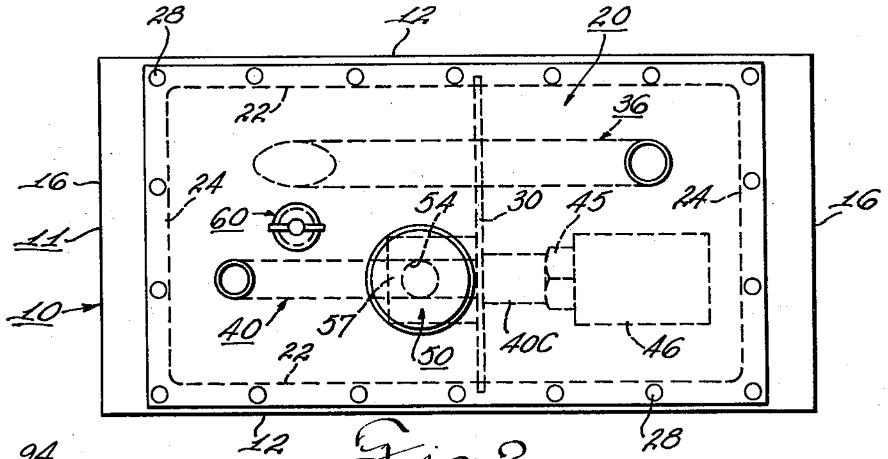
FIG. 2 is a top plan view of the reservoir of FIG. 1.

Referring now to the drawings, there is shown a reservoir generally indicated at 10 for hydraulic fluid including a reservoir tank generally indicated at 11 and a detachable cover member for the tank generally indicated at 20.

In the illustrated embodiment the reservoir tank 11 is of hollow rectangular shape and includes a pair of laterally spaced longitudinally extending side walls 12 joined by a bottom wall 14. At its opposite longitudinal ends, tanks 11 is provided with end walls 16 which join the bottom wall 14 and the opposite longitudinal side walls 12 to define the hollow rectangular shape of reservoir tank 11.

Figure 1:
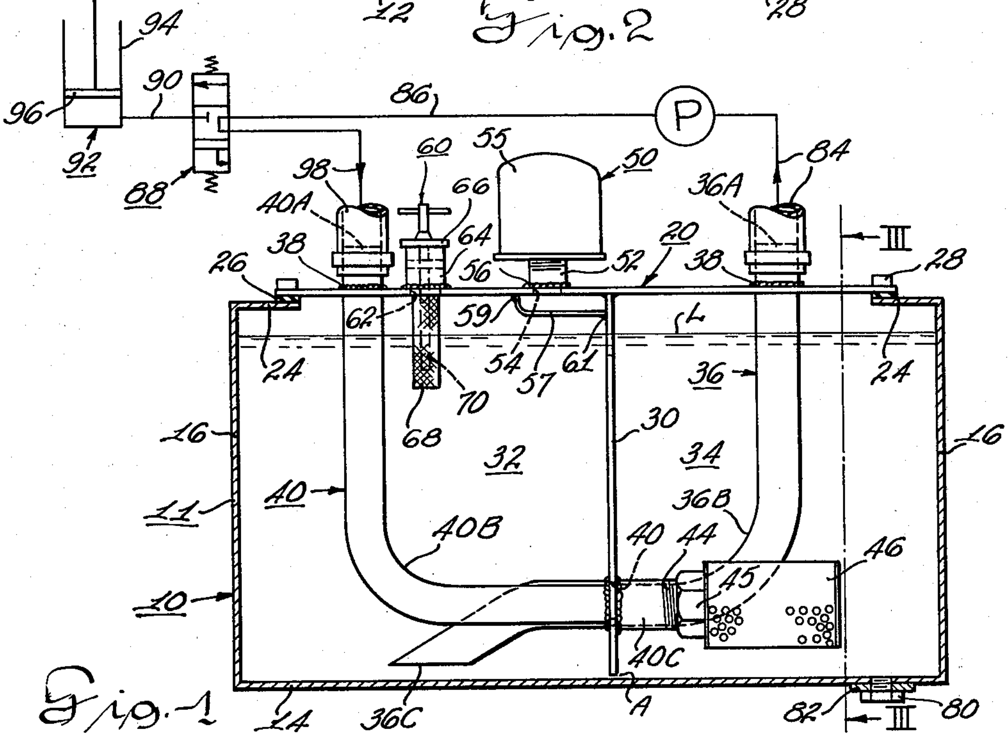
FIG. 1 is a view partially in vertical section and partially in vertical elevation showing the hydraulic fluid reservoir with the cover mounted thereon.
Figure 3:
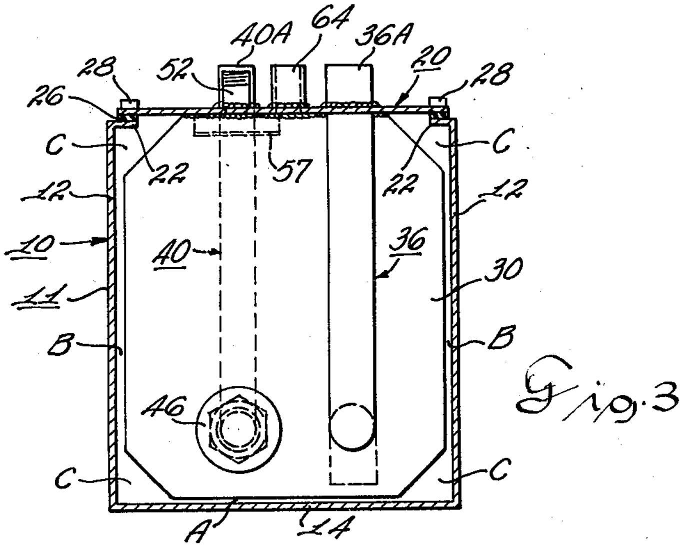
FIG. 3 is a view in transverse section taken along line III—III of FIG. 1.

The upper ends of the laterally spaced longitudinally-extending side walls 12 are respectively provided with relatively narrow laterally inwardly extending flange portions, each generally indicated at 22; and, correspondingly, the upper ends of each of the oppositely disposed end walls 16 are provided with laterally inwardly extending flange portions 24. The flange portions 22 of the oppositely longitudinal side walls 12 and the flange portions 24 of the oppositely disposed end walls 16 serve as a support for the removable cover member 20. The inner periphery of the respective flanges 22 and 24 define an opening which is normally closed by the removable cover member 20. A suitable gasket 26 is interposed between the upper surface of flanges 22 and 24, and the mating under surface of cover member 20 as best seen in FIGS. 1 and 3 of the drawing. Cover member 20 is detachably secured to flanges 22 and 24 by means of a plurality of spaced capscrews 28.

A baffle member generally indicated at 30 has the upper edge thereof (relative to FIG. 1) rigidly secured as by welding to the normally inner or under surface of cover member 20 substantially at the midpoint of the length of the cover member 20 as viewed in FIG. 1. Baffle 30 extends in a plane perpendicular to the under surface of cover member 20, and when cover member 20 is in installed position as shown in the drawing, baffle member 30 divides the hollow interior of the reservoir tank 11 into what might be termed an intake or suction chamber generally indicated at 32 on the left-hand side of baffle 30 relative to the view shown in FIG. 1 and into a return chamber 34, on the right-hand side of the baffle 30 relative to the view of FIG. 1.

In the embodiment of the present invention in which baffle 30 divides reservoir tank 11 into a suction chamber 32 and a return chamber 34, the baffle performs the following functions:

1. It minimizes transfer to suction chamber 32 of any turbulence associated with the discharge of the hydraulic fluid into the return chamber 34.

2. By the rigid attachment of baffle 30, as by welding, to the suction conduit 36 and to the return conduit 40 where these two conduits pass through baffle 30 (to be described), and by the rigid attachment of baffle 30, as by welding, to the cover member 20, the cover member 20, the baffle 30, the conduits 36 and 40, and the welded attachment of these members as described all cooperate, together with the rigid attachment, as by welding of conduits 36 and 40 to cover 20 (to be described), to provide a structurally strong and reinforced removable subassembly.

As best seen in the views of FIGS. 1 and 3, while the upper edge of baffle 30 extends into contact with and is welded to the under surface of cover member 20 for a substantial portion of the transverse width of reservoir tank 11, the lower end of baffle 30 with cover 20 in position is spaced a short distance above the upper or inner surface of bottom wall 14 of reservoir tank 11 as indicated at A, and the laterally opposite vertical edges of baffle 30 are spaced laterally inwardly a short lateral distance from the corresponding inner surfaces of the longitudinally extending side walls 12 of reservoir tank 11 as indicated at B (FIG. 3); and, furthermore, the two opposite upper corners and the two opposite lower corners of baffle 30 are cut at a bias to leave spaces indicated at C between the baffle and the contiguous surfaces of reservoir tank 11 and/or of cover member 20. Thus, the spaces A, B and C between baffle 30 and the contiguous surfaces of reservoir tank 11 and/or cover member 20 permit fluid flow between suction chamber 32 and return chamber 34 (FIG. 1) on opposite sides of baffle 30.

A suction conduit generally indicated at 36 projects through a suitable aperture in cover 20 and extends a relatively short distance above cover 20 as indicated at 36A. Conduit 36 is rigidly attached to cover 20 in the region where it passes through cover 20 by suitable means such as welding indicated at 38. Suction conduit 36 extends downwardly through return chamber 34 relative to the view of FIG. 1, then bends as indicated at 36B, and passes through an aperture 40 in baffle 30, suction conduit 36 extending into suction chamber 32 where it terminates at a suction inlet indicated at 36C contiguous but spaced above the inner surface of bottom wall 14 of reservoir tank 11. Suction conduit 36 is welded to baffle 30 at the periphery of aperture 40 where conduit 36 passes through baffle 30 to enter suction chamber 32.

A return conduit generally indicated at 40 projects through a suitable aperture in cover 20, the portion 40A of conduit 40 projecting a short distance above the upper surface of cover 20. Return conduit 40 is rigidly attached as by welding 38 to cover 20 in the region where conduit 40 passes through cover 20. Return conduit 40 extends vertically downwardly through suction chamber 32 and bends substantially at right angles as indicated at 40B, then passing through a suitable aperture in baffle 30 contiguous the lower portion of baffle 30, whereby conduit 40 projects into return chamber 34, the portion of return conduit 40 projecting into chamber 34 being indicated at 40C. The conduit 40 is rigidly secured as by welding 42 to baffle 30 in the region where conduit 40 passes through baffle 30.

It will thus be seen from the foregoing that both the suction conduit 36 and the return conduit 40 are rigidly secured as by welding to the baffle 30 in the regions where the respective conduits 36 and 40 pass through corresponding apertures in baffle 30. The portion 40C of the return conduit 40 which projects into chamber 34 is threaded, as indicated at 44, and a hollow diffuser chamber 46 of generally cylindrical shape is secured with the aid of a lock nut 45 to threaded end 44 of return conduit 40 within return chamber 34. Diffuser 46 is suitably perforated preferably only on the lower half of the periphery thereof to permit hydraulic liquid from return conduit 40 which enters diffuser 46 to pass outwardly in a generally downward direction into return chamber 34 with a minimum of turbulence.

A breather generally indicated at 50 is also suitably rigidly mounted on the upper or outer surface of cover member 20. A short conduit 52 is positioned in registry with and extends above aperture 54 in cover 20, conduit 52 communicating at its upper end with the interior of breather chamber 55 which is suitably perforated to communicate with the ambient atmosphere. The lower end of conduit 52 communicates with the gas space above the liquid level L in reservoir tank 11, whereby breather 50 communicates the gas space above the liquid level L with the external atmosphere. Breathers, per se, are well known in the art. The short conduit 52 which forms part of the breather assembly is rigidly connected as by welding 56 to the upper surface of cover member 20.

A combined dip stick and fill tube assembly generally indicated at 60 is also rigidly mounted on cover 20 of reservoir tank 11. The dip stick and fill tube assembly 60 is in registry with an aperture 62 through cover 20. A fill tube 64 is rigidly secured as by welding to the upper surface of cover 20 and is provided with a detachable cover member 66. A hollow tubular filter screen 68 is rigidly attached to the under surface of cover 20 in vertical axial alignment with fill tube 64. A removable dip stick 70 extends downwardly through fill tube 64 and into the interior of the tubular filter screen 68 whereby to be used to measure the level of the hydraulic liquid in reservoir tank 11.

A splash plate 57 is rigidly mounted beneath aperture 54 of cover 20 which communicates with the interior of breather assembly 50. The upper end of splash plate 57 is welded to the under surface of cover 20 as indicated at 59 and the opposite end of splash plate 57 is welded as at 61 to vertical baffle 30 contiguous the upper end of baffle 30, but spaced below the under surface of cover 20. As its name implies, the "splash plate" 57 prevents hydraulic fluid from splashing up into the interior of the breather 50 through the aperture 54 and through the short conduit 52, but at the same time, is open at the lateral sides thereof to permit the gas pressure inside the upper end of the reservoir tank 11 above liquid level L to equalize with the external atmospheric pressure through breather assembly 50. A drain plug 80 is provided at one end of the bottom wall 14 of reservoir tank 11. Drain plug 80 may be in screw threaded engagement with a plate 82 secured to the under surface of bottom wall 14.

With cover 20 in position as shown in the views of the drawing, a conduit 84 is suitably detachably coupled to the portion 36A of suction conduit 36 which projects above the level of the upper surface of cover 20. Conduit 84 is connected to the suction side of a pump P. The discharge side of the pump P is connected by a conduit 86 to an "open center" hydraulic control valve generally indicated at 88, valve 88 being shown in its neutral position. The discharge from open center hydraulic valve 88 when valve 88 is not in neutral position is connected by a conduit 90 to the inlet of a cylinder 94 of a hydraulic ram generally indicated at 92. Ram 92 is provided with a linearly movable piston 96 which is movable in cylinder 94 under the influence of the hydraulic fluid admitted to cylinder 94. The open center valve 88, which forms no part of the present invention, may be used to control the movement of piston 96 which forms part of the ram generally indicated at 92. As is well known in the hydraulic valve art, an open center hydraulic valve is one in which there is a constant hydraulic flow through the valve when the valve is in neutral position as illustrated in the view of FIG. 1.

The return hydraulic flow to reservoir tank 11 from hydraulic valve 88 is through conduit 98 which is suitably coupled to the end 40A of return conduit 40.

If it should be desired to clean the interior of the reservoir tank 11, the conduits 84 and 98 can be detached from their connections to the respective ends 36A and 40A of the respective suction and return conduits 36 and 40, thereby disconnecting the reservoir from the external hydraulic circuit. Capscrews 28 may then be removed from their engagement with the flanges 22 and 24 of reservoir tank 11.

Before removing cover 20 and the components attached thereto, cover 20 is given a slight angular turn about its central vertical axis to permit the attached baffle 30 to clear the overlying flanges 22 on side walls 12 of the reservoir tank 11. This same angular movement of cover 20 is also necessary when cover 20 is being placed in position to permit baffle 30 to assume its proper position relative to the overhanging flanges 22.

With capscrews 20 detached from engagement with reservoir tank 11, and with cover 20 being given the angular movement just described to clear flanges 22, cover 20 and all the attachments thereto may then be bodily removed from the reservoir tank 11 off of the supporting flanges 22 and 24, and cover 20 will carry with it baffle 30, suction conduit 36 including portion 36A of suction conduit 36, return conduit 40 and portion 40A of return conduit 40, dip stick and fill tube assembly 60, breather 50, splash plate 57, and diffuser 46 attached to the end of return conduit 40. Thus, when the cover 20 is removed all of the various components just enumerated will also be removed from the reservoir tank 11 and the reservoir tank 11 will be empty except for any oil which may still remain therein. The removal of cover 20 and all of the attached components as just described facilitates cleaning of the reservoir tank 11 and also facilitates any necessary repair or servicing of the component parts which are carried by the cover 20.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. In combination, a hollow reservoir tank for a hydraulic fluid or the like, said reservoir tank having an enlarged opening on one side thereof, a detachable cover member for said opening, a suction conduit passing through and rigidly secured to said cover member and extending into the interior of said reservoir tank when said cover member is in covering relation to said opening whereby to withdraw hydraulic fluid from said reservoir tank, a return conduit passing through and rigidly secured to said cover member and extending into the interior of said reservoir tank when said cover member is in covering relation to said opening whereby to introduce hydraulic fluid into said reservoir tank, said suction conduit and said return conduit projecting beyond the normally outer surface of said cover member and being adapted to be connected into a hydraulic circuit external of said reservoir tank, said suction conduit and said return conduit due to their rigid connection to said cover member being removable from said reservoir tank along with said cover member when said cover member is removed from said reservoir tank, and a baffle member rigidly secured to the normally inner surface of said cover member and extending in a plane substantially perpendicular to the major plane of said cover member, whereby to divide said reservoir tank into first and second chambers lying on opposite sides of the major plane of said baffle member when said cover member is in covering relation to said opening, said baffle member being constructed to permit fluid communication between said chambers, one of said conduits passing from its rigid connection to said cover member first through said first chamber, thence through said baffle member, and thence into said second chamber when said cover member is assembled on said reservoir tank, the other of said conduits passing from its rigid connection to said cover member first through said second chamber, thence through said baffle member and thence into said first chamber when said cover member is assembled on said reservoir tank, and means rigidly securing each respective conduit to said baffle member in the respective regions where said respective conduits pass through said baffle member.

2. The combination defined in claim 1 in which said return conduit has a hydraulic fluid diffuser secured to the end thereof through which hydraulic fluid discharges into said reservoir tank.

3. The combination defined in claim 1 in which a "breather" member is rigidly mounted on the normally outer surface of said cover member, said breather member being in gaseous fluid communication with the interior of the upper end of said reservoir tank and also with the ambient atmosphere in which said reservoir tank is located when said cover member is assembled on said reservoir tank, whereby to maintain at atmospheric pressure the gas space above the liquid level in said reservoir tank, said breather member being removable from said reservoir tank along with said cover member when said cover member is removed from said reservoir tank.

4. The combination defined in claim 1 in which a combined fill tube and dip stick holder is rigidly mounted on the normally outer surface of said cover member, whereby a dip stick may extend through said fill tube into the interior of the upper end of said reservoir tank to measure hydraulic fluid level in said reservoir tank when said cover member is in covering relation to said opening.

5. The combination defined in claim 1 in which said suction conduit and said return conduit are respectively rigidly welded to said cover member where said respective conduits pass through said cover member.

6. The combination defined in claim 1 in which the means rigidly securing each respective conduit to said baffle member where said respective conduits pass through said baffle member are respectively welded connections.

7. A detachable cover member for use in covering an opening of a hollow reservoir tank for hydraulic fluid or the like, said cover member comprising in combination therewith a suction conduit passing through and rigidly secured to said cover member and extending into the interior of said reservoir tank when said cover member is in covering relation to said opening whereby to withdraw hydraulic fluid from said reservoir tank, a return conduit passing through and rigidly secured to said cover member and extending into the interior of said reservoir tank when said cover member is in covering relation to said opening whereby to introduce hydraulic fluid into said reservoir tank, said suction conduit and said return conduit due to their rigid connection to said cover member being removable from said reservoir tank along with said cover member when said cover member is removed from said reservoir tank, a baffle member rigidly secured to the normally inner surface of said cover member and extending in a plane substantially perpendicular to the major plane of said cover member, whereby to divide said reservoir tank into first and second chambers lying on opposite sides of the major plane of said baffle member when said cover member is in covering relation to said opening, said baffle member being constructed to permit fluid communication between said chambers, one of said conduits passing from its rigid connection to said cover member first through said first chamber, thence through said baffle member, and thence into said second chamber when said cover member is assembled on said reservoir tank, the other of said conduits passing from its rigid connection to said cover member first through said second chamber, thence through said baffle member and thence into said first chamber when said cover member is assembled on said reservoir tank, and means rigidly securing each respective conduit to said baffle member in the respective regions where said respective conduits pass through said baffle member.

8. A detachable cover member as defined in claim 7 in which said return conduit has a hydraulic fluid diffuser secured to the end thereof through which hydraulic fluid discharges into said reservoir tank.

9. A detachable cover member as defined in claim 7 in which a breather member is rigidly mounted on the normally outer surface of said cover member, said breather member being in gaseous fluid communication with the interior of the upper end of said reservoir tank and also with the ambient atmosphere in which said reservoir tank is located when said cover member is assembled on said reservoir tank, whereby to maintain at atmospheric pressure the gas space above the liquid level in said reservoir tank, said breather member being removable from said reservoir tank along with said cover member when said cover member is removed from said reservoir tank.

10. A detachable cover member as defined in claim 7 in which a combined fill tube and dip stick holder is rigidly mounted on the normally outer surface of said cover member, whereby a dip stick may extend through said fill tube into the interior of the upper end of said reservoir tank to measure the hydraulic fluid level in said reservoir tank when said cover member is in covering relation to said opening.

11. A detachable cover member as defined in claim 7 in which said suction conduit and said return conduit are respectively rigidly welded to said cover member where said respective conduits pass through said cover member.

12. A detachable cover member as defined in claim 7 in which the means rigidly securing each respective conduit to said baffle member where said respective conduits pass through said baffle member are respectively welded connections.

* * * * *